US007770868B2

(12) United States Patent
Koop

(10) Patent No.: US 7,770,868 B2
(45) Date of Patent: Aug. 10, 2010

(54) TELESCOPIC LIFTING ASSEMBLY

(75) Inventor: Björn Koop, Regensburg (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 374 days.

(21) Appl. No.: 11/785,576

(22) Filed: Apr. 18, 2007

(65) Prior Publication Data

US 2007/0256555 A1 Nov. 8, 2007

(30) Foreign Application Priority Data

May 4, 2006 (AT) ............................... A 765/2006

(51) Int. Cl.
*B66F 3/24* (2006.01)
*F01B 1/00* (2006.01)
*B66F 7/10* (2006.01)

(52) U.S. Cl. .................. 254/93 R; 254/89 H; 187/274; 92/146

(58) Field of Classification Search ............... 254/93 R, 254/89 H, 92, 93 H, 100; 187/215, 272, 187/274; 5/11, 181, 614; 92/61, 73, 75, 92/146, 151; 91/508; 40/422, 477
See application file for complete search history.

(56) References Cited

U.S. PATENT DOCUMENTS 3,169,377 A * 2/1965 Hoffmann ................... 405/297
3,477,229 A * 11/1969 Katko .......................... 60/394
3,609,974 A * 10/1971 Lado ........................... 60/560
4,363,380 A * 12/1982 Rued et al. .................. 187/274
4,589,642 A 5/1986 Schnelle et al.
4,601,234 A * 7/1986 Hoinkis ......................... 92/88
5,431,087 A * 7/1995 Kambara ..................... 92/146
5,636,713 A 6/1997 Perkins et al.
6,431,322 B1 * 8/2002 Rossman et al. ............ 187/272
6,886,200 B2 * 5/2005 Blyshak et al. ................ 5/611

FOREIGN PATENT DOCUMENTS

| | | |
|---|---|---|
| CA | 2434996 | 8/2002 |
| DE | 3328908 | 2/1985 |
| WO | 9405583 | 3/1994 |

* cited by examiner

*Primary Examiner*—John Q Nguyen
*Assistant Examiner*—Stefan Kruer
(74) *Attorney, Agent, or Firm*—Dykema Gossett PLLC

(57) ABSTRACT

A telescopic lifting assembly designed particularly for the hydraulic height adjustment of a medical treatment table includes two antiparallel juxtaposed linear drives (2, 3) connected functionally one behind the other in the direction of actuation (1) whereby the inner components (6) are connected to a coupling piece (7) which is provided with guide surfaces (14) cooperating with the outer components (5) in the direction of actuation (1). A secure and stable guiding mechanism is made possible thereby along the entire lifting range.

8 Claims, 2 Drawing Sheets

TELESCOPIC LIFTING ASSEMBLY

BACKGROUND OF THE INVENTION

1. Field of the Invention

The invention relates to a telescopic lifting assembly that includes two antiparallel juxtaposed linear drives connected functionally one behind the other in the direction of actuation and having an inner component extending upward relative to an outer component during actuation, especially for the purpose of hydraulic height adjustment of a medical treatment table by means of linear drives in the form of pressure actuated cylinder/piston arrangements.

2. The Prior Art

In the classical design of such arrangements, a plurality of pneumatic or hydraulic cylinder/piston arrangements are most often provided which are inserted concentrically into one another whereby the piston rod of an outer unit is hollow and forms directly the cylinder for the following unit. The individual cylinder/piston arrangement can be biased with a pressure medium parallel and simultaneously or individually or one after the other as well. Depending on the number of parallel phases working in the same direction, the total lifting height can be a multiple of the longitudinal extension of the lifting assembly relative to its retracted state. Such lifting assemblies are used for various purposes such as for elevating platforms, tables adjustable in height, as in the case of the above-mentioned medical treatment tables or the like. Similar designs are also disclosed in WO 94/05583, for example, whereby the individual drives are always connected from one inner component to the following outer component.

The above-described multiphase lifting assemblies inserted into one another have various disadvantages in terms of the pressure medium connection to or between the individual phases, the guiding and sealing means, the prevention against twisting and similar occurrences despite the small basic height compared to the total achievable lift whereby it is sufficient that the achievable lift is equal to the double amount of the individual stroke lengths which is achieved by means of two antiparallel juxtaposed linear drives. Arrangements of the aforementioned type are being presently used and have the advantage that they can be realized by constructing them in small dimensions and with common linear drives without difficulties, such as commercially available hydraulic cylinder/piston arrangements. For example, surgical tables with such telescoping lifting assemblies are disclosed in CA 24 34 996 A1, US 2002/144349 A1, U.S. Pat. No. 5,431,087 or DE 33 28 908 A1, whereby the two antiparallel cylinder/piston arrangements are in communication with the two cylinders juxtaposed in reverse order and which remain relatively stationary thereby in the center between the outer coupling points of the piston rod, which means practically in the center of the lifting assembly. The outer surfaces of the cylinders are thereby interconnected. The inner components act upon different parts. The connected cylinders travel halfway with the stroke that extends at the other end of the lifting assembly. In these known arrangements it is particularly a disadvantage that the two piston rods, which are extending relatively far outwardly, must be either constructed very sturdy or have additional separate guides to make corresponding total lifting heights possible so that no problem can occur in terms of lateral tilting or twisting, especially in case of lifting heavy loads. These additional measures cause such lifting assemblies to be again relative spacious in their construction which limits free footage under the table, especially in the mentioned use for the adjustment of medical treatment tables.

It is the object of the present invention to improve a telescopic lifting assembly of the aforementioned type in such a manner that the mentioned disadvantages of the known arrangement are avoided and that secure and stable guiding of the lifting assembly is ensured in an especially simple and space-saving manner even in case of heavy loads.

SUMMARY OF THE INVENTION

This object is achieved according to the present invention with a lifting assembly of the aforementioned type in that the inner components of the linear drives are connected to a coupling piece which is provided with guide surfaces cooperating with the outer components in the direction of actuation. The two antiparallel juxtaposed linear drives are thereby again fixedly connected to one another through a S-shaped element at its extending ends during actuation of the extending inner components, which has the great advantage that said coupling piece can be provided at the same time with a guide surface for the relative stationary outer components of the associated linear drive whereby the lifting assembly can be guide and supported effectively on the robust outer components along its entire lifting height and whereby it can also be employed without problems in the use for heavy loads. Total lifting heights can also be realized with central antiparallel connected cylinders as indicated in the described embodiments whereby said heights correspond to twice the single lifting height and whereby the coupling piece travels along to the center which is half of the total lifting height.

In an especially preferred embodiment of the invention it is proposed that the guide surfaces of the coupling piece cooperate directly with the outer surface of the tube-like hydraulic cylinders of the linear drives, which make possible a simple design of the outer components and the guide surfaces. Besides, track-like separate guides can be provided which are formed or attached to the outer components, for example.

In an additional preferred embodiment of the invention, the guide surfaces of the coupling piece and/or the outer element may be provided with plain bearing materials, preferably a synthetic material, which will make the lifting assembly operate smoothly even under high loads.

The guide surface may also be arranged on bearing blocks which are adjustable relative to the coupling piece, which makes possible the accurate adjustment during installation to compensate for manufacturing tolerances, for example.

In a preferred additional embodiment of the invention it is proposed that at least one of the linear drives is provided with several parallel-arranged hydraulic cylinders, which makes not only the simple availability of greater forces possible, but above all the simple prevention against twisting of the lifting assembly without having to make any other additional arrangement. The hydraulic cylinders may also be arranged symmetrically on one side of the lifting assembly or also on both sides of the hydraulic cylinder(s) to make a symmetric construction of the lifting assembly possible which will prevent lateral stress on the linear drives or their guide surface based on its construction.

In an additional embodiment of the invention, different linear drives can be arranged on both sides of the lifting assembly, particularly hydraulic cylinders having various piston diameters and/or stroke heights. The hydraulic cylinders may be actuated independently to one another in an additional embodiment of the invention and they may be controlled with different pressure mediums, in particular. Very suitable arrangements can thereby be realized for a variety of uses in the simplest manner.

In an additional preferred embodiment of the invention, the hydraulic cylinders of a linear drive may be respectively connected together with a support component, which is preferably also provided with exterior mounting pieces of the lifting assembly. This results in an additional reinforcement of the arrangement in the simplest manner, which can be constructed in very small dimensions even for use of heavy loads and which provides a very large space for free footing under the treatment table in the previously mentioned use for height adjustment of a medical treatment table.

The invention is described in more detail in the following with the aid of embodiment examples illustrated in the drawings.

DETAILED DESCRIPTION OF THE PREFERRED EMBODIMENTS

Figure 1:
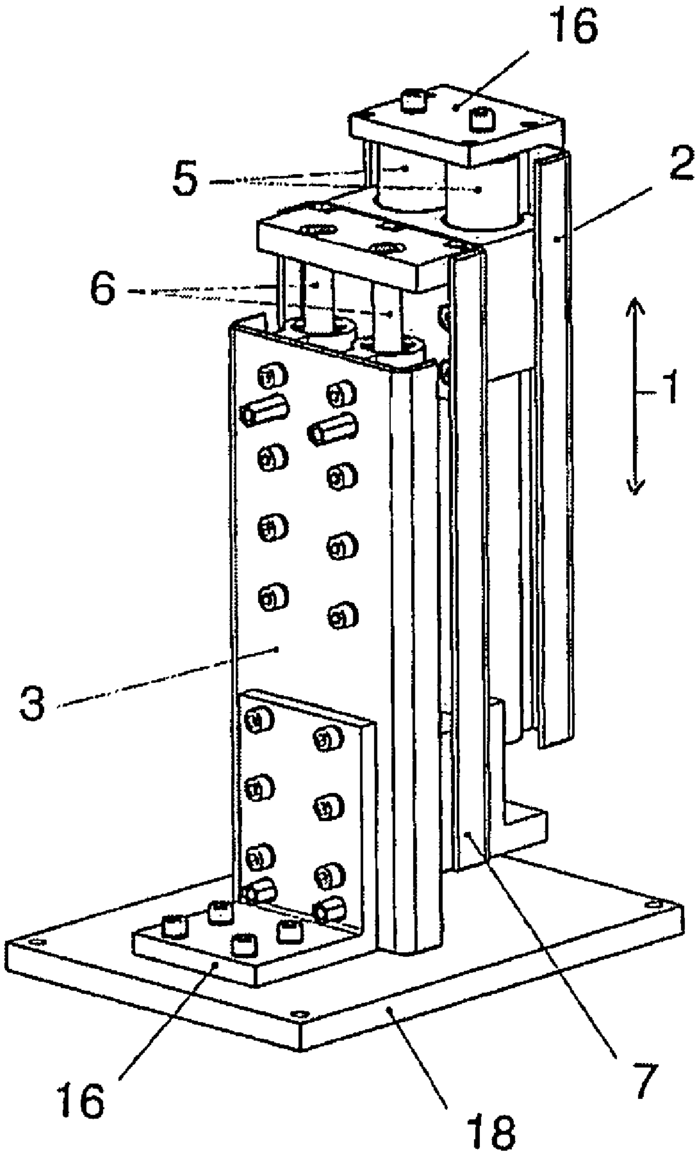
FIG. 1 shows in a perspective view a telescopic lifting assembly according to the invention in a nearly complete retracted condition.
Figure 2:
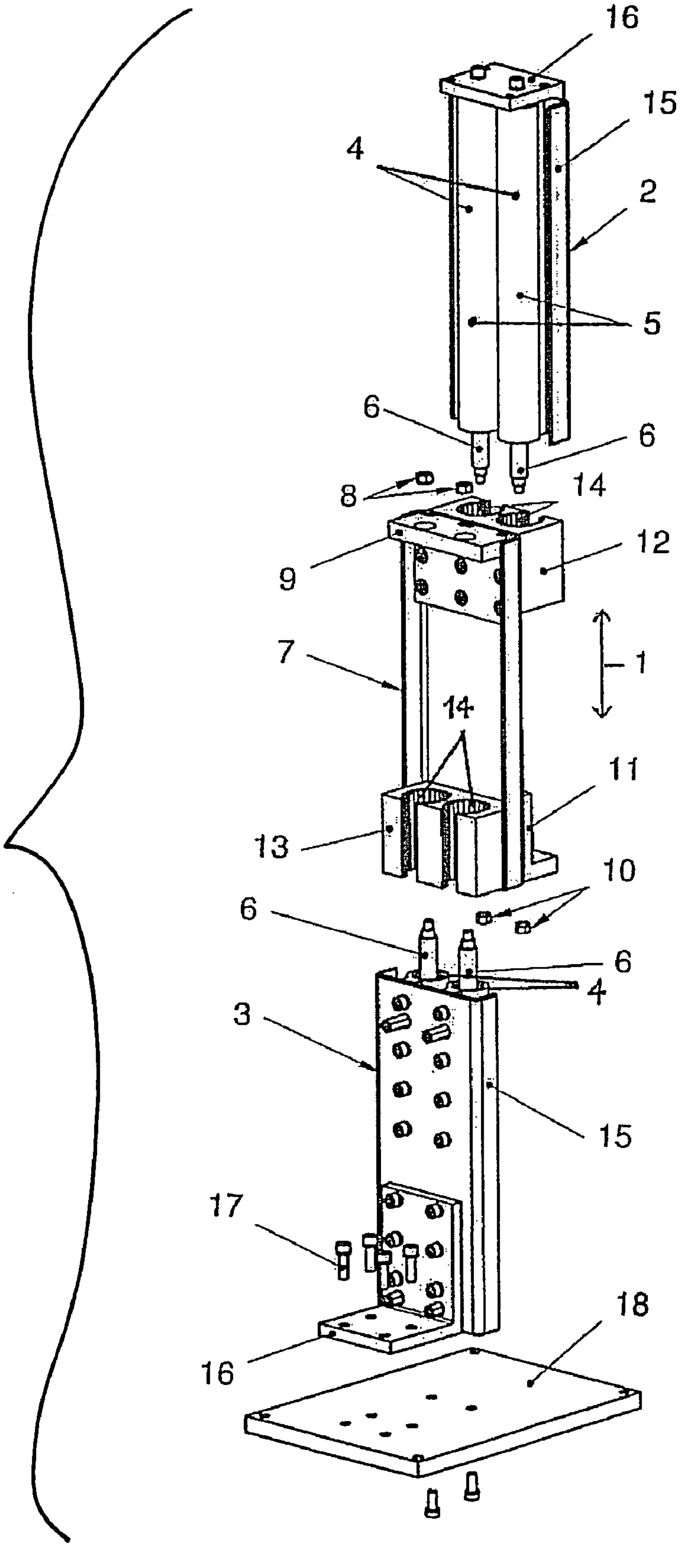
FIG. 2 shows the lifting assembly of FIG. 1 in an exploded view.

The illustrated telescopic lifting assembly is provided with two antiparallel juxtaposed linear drives 2, 3 functionally connected one behind the other in the direction of actuation (arrow 1), the linear drives being provided with two respective hydraulic cylinder/piston arrangements 4 arranged parallel and juxtaposed. However, the linear drives 2, 3 could also be designed in any other traditional known manner, e.g., in the form of electric screw spindle drives or the like—essential is only one inner component 6 (the piston rod in this case) extending outwardly relative from an outer component 5 (the cylinder in this case) during actuation, which makes possible a relative displacement between the outer end of the extending inner component and the outer component (and especially its opposed end). The inner components 6 of the linear drives 2, 3 or the cylinder/piston arrangements 4 are interconnected through a coupling piece 7 to reach a relatively great height (see FIG. 2) of the extending lifting assembly (namely double the original height in terms of measurement) based on the relative low total height of the retracted lifting assembly as is can be conceived from the illustration in FIG. 1. As it can be seen in FIG. 2, the upwardly pointing end pieces of the inner components (or the piston rods) 6 of the lower linear drive 3 can be fastened by means of nuts 8 onto an upper support bracket 9 and the downwardly pointing end pieces of the inner components 6 (or the piston rods) of the upper linear drive 2 can be fastened by means of nuts 10 onto a support bracket 11 on the lower end of the coupling piece 7. On the respective opposite side of the support brackets 9, 11 there are provided guide surfaces 14 on bearing blocks 12, 13, which can be adjusted relative to the coupling piece 7, whereby said guide surfaces cooperate with the outer components 5 of the linear drives 2, 3 or with the cylinders or the cylinder/piston arrangement 4 in the direction of actuation (1) and whereby the lifting assembly is guided along the entire lifting range not only along the piston rods and their guides and the seals in the cylinders but also, and above all, along the stable cylinders and the also along the stable bearing blocks of the coupling piece. This results thereby in a very stable and non-twistable guide during the movement of the lifting assembly, especially in connection with the dual arrangement of the respective two cylinder/piston arrangements 4 per linear drive 2,3 whereby the lifting assembly is thereby also greatly suitable in the use of heavy loads.

The guide surfaces 14 are provided preferably with plain bearing materials e.g., made of synthetic material, which guarantees smooth operation of the lifting assembly even with heavy loads.

Aside from the illustrated "asymmetrical" arrangement of the two linear drives 2, 3, which causes a lateral moment onto the lower fastening of the lower drive 3 with the vertical load biasing the upper end of the linear drive 2 whereas the hydraulic cylinders or the linear drives of one side of the lifting assembly could also be arranged symmetrical at both sides of the linear drive(s) relative to the other side of the lifting assembly, which would results in two separate upper linear drives or two separate lower linear drives with respectively one linear drive operating in the center of the other side and which would prevent lateral stresses of the above-described kind.

In addition, different linear drives could be arranged at both sides of the lifting assembly, especially hydraulic cylinders with different piston diameters and or strokes, which could be actuated independently to one another and, especially, they could be controlled separately with the use of different pressure mediums.

The hydraulic cylinders or the cylinder/piston arrangement 4 of the two linear drives 2, 3 are respectively connected to a support component 15, which is made in this case in the form of a folded piece of sheet iron and whereby the support component is also provided with the upper and lower exterior mounting pieces 16 of the lifting assembly. The lower mounting piece 16 is fastened to a base plate 18 by means of bolts 17—the type of connection of the upper mounting piece 16 to a surgical table or the like is not illustrated here.

Figure 3:
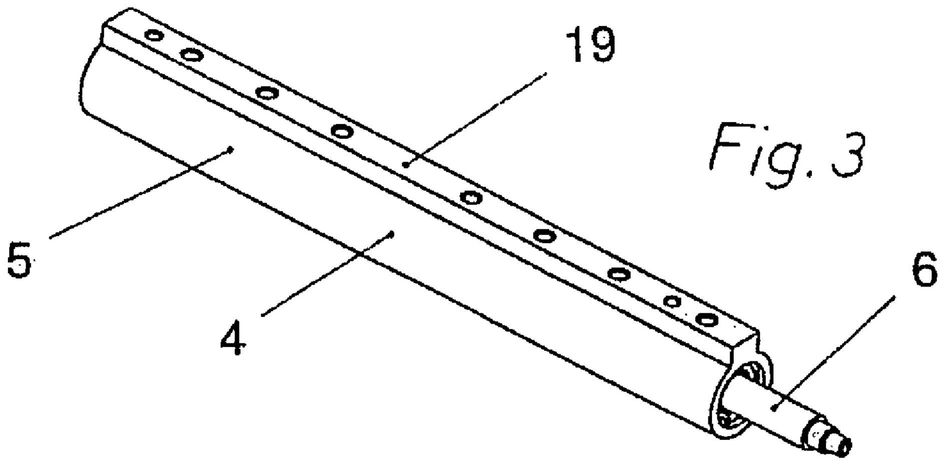
FIG. 3 shows a single cylinder/piston arrangement of the lifting assembly from FIG. 1 and FIG. 2.

As it can be seen especially in FIG. 3, the outer component 5 of the cylinder/piston arrangement 5 is smooth and cylindrical, except for the connecting strip 19 having threaded holes for fastening of the support element 15 and having connections for the hydraulic system. The smooth and cylindrical shape makes possible for a large surface to cooperate with the guide surfaces 14 of the coupling piece 7 and which guarantees thereby also smooth operation of the lifting assembly even in case of heavy loads and laterally impacting moments. Besides, the outer components 5 can naturally be provided with separate guide tracks or the like to cooperate with the corresponding guide surfaces of the coupling piece 7, if necessary.

I claim:

1. A telescopic lifting assembly which comprises:

a first linear drive assembly which includes at least one first hydraulic piston/cylinder device having a piston rod that is extendable from a cylinder in a first direction, a second linear drive assembly which includes at least one second hydraulic piston/cylinder device having a piston rod which is extendable from a cylinder in a second direction, said second direction being opposite said first direction, and an elongated coupling element, said elongated coupling element having opposite first and second ends, said elongated coupling element defining at least one first guide surface at said first end through which the cylinder of said first linear drive assembly slidingly extends and at least one second guide surface at said second end thereof through which the cylinder of said second linear drive assembly slidingly extends, first attachment means for fixedly attaching the piston rod of said first linear drive assembly to the second end of said elongated coupling element and second attachment means for fixedly attaching the piston rod of said second linear drive assembly to the first end of said elongated coupling element so to that extension and retraction of said piston rods relative to said cylinders will cause extension and contraction of said lifting assembly.

2. The telescopic lifting assembly according to claim 1, wherein the first linear drive assembly includes a support component which defines at least opposite first and second ends and includes a first mounting bracket at said first end for attachment at a base plate.

3. The telescopic lifting assembly according to claim 2, wherein the second linear drive assembly includes a support component which defines opposite first and second ends and includes a second mounting bracket at said second end thereof attached to an item to be supported.

4. The telescopic lifting assembly according to claim 1, wherein said first linear drive assembly includes a plurality of first hydraulic piston/cylinder devices which are aligned in parallel, and said second linear drive assembly includes a plurality of second piston/cylinder devices which are aligned in parallel.

5. The telescopic lifting assembly according to claim 4, wherein the plurality of first and second hydraulic piston/cylinder devices are symmetrically arranged on opposite sides of said coupling element.

6. The telescopic lifting assembly according to claim 1, wherein said elongated coupling element is positioned between said first and second linear drive assemblies.

7. The telescopic lifting assembly according to claim 6, wherein the first guide surface is on a first side of the elongated coupling element and the second guide surface is on a second side thereof.

8. The telescopic lifting assembly according to claim 1, wherein the elongated coupling element includes a first bearing block at said first end thereof which provides said at least one first guide surface, and wherein the elongated coupling element includes a second bearing block at said second end thereof which provides said at least one second guide surface.

* * * * *